United States Patent [19]
Drysdale et al.

[11] Patent Number: 5,192,354
[45] Date of Patent: Mar. 9, 1993

[54] SOIL SUBSTITUTE

[75] Inventors: Christopher J. Drysdale, Berwick; David G. Nichols, Devon Meadows, both of Australia

[73] Assignee: Debco Pty. Ltd., Australia

[21] Appl. No.: 482,950

[22] Filed: Feb. 22, 1990

[30] Foreign Application Priority Data

Feb. 24, 1989 [AU] Australia ............... PJ2929/89

[51] Int. Cl.⁵ ................ C05F 9/04; C05F 11/02
[52] U.S. Cl. ............................ 71/9; 71/23; 71/903; 71/904
[58] Field of Search ............. 71/1, 9, 10, 11, 23–25, 71/903, 904

[56] References Cited

U.S. PATENT DOCUMENTS 3,198,620  8/1965  Larson ................... 71/13 X
3,824,092  7/1974  Wikstrom ............... 71/24 X
4,067,716  1/1978  Sterrett ................... 71/25 X

FOREIGN PATENT DOCUMENTS 3330749 10/1984 Fed. Rep. of Germany .......... 71/23

Primary Examiner—Ferris Lander
Attorney, Agent, or Firm—Finnegan, Henderson, Farabow, Garrett & Dunner

[57] ABSTRACT

Soil substitute capable of supporting plant growth is produced in quantities suitable for substitution on a large scale, such as in landscaping operations. Shredded treebark is intimately mixed with quarry stone particles and silica sand particles and are then composted while mixed with the quarry stone particles and sand particles. Composting is performed by laying out the mixture in windrows and aerating the shredded treebark by mechanically turning material in the windrows so that composting proceeds within the temperature range 42–60 degrees Celcius.

6 Claims, No Drawings

SOIL SUBSTITUTE

TECHNICAL FIELD

This invention relates to soil substitutes capable of supporting plant growth. More particularly, it enables production of a soil substitute in quantities suitable for soil substitution on a large scale, such as in landscaping operations.

At present, landscaping operations consume large quantities of natural top soil harvested from soil supply site. The resulting degradation of large tracts of land around major population centers is a major environmental problem which can only be overcome by the development of a soil substitute which will support plant growth and which is of such mechanical strength and workability that it can be used for large scale landscaping purposes. Currently available soil substitutes do not meet these requirements and are generally limited to small scale applications such as for potting mixes. The present invention enables the production of a soil substitute which can be produced economically in large quantities without the environmental problems associated with the harvesting of naturally occurring top soil.

DISCLOSURE OF THE INVENTION

According to the invention there is provided a method of producing a soil substitute comprising intimately mixing shredded treebark with quarry stone particles and silica sand particles and composting the shredded treebark particles while mixed with the quarry stone particles and sand particles.

The term "composting" is made in this specification to refer to a process of rapid decomposition of the organic material, and includes partial decomposition to produce desired characteristics.

The composting step may include the addition of water to the mixture of shredded treebark, quarry stone particles and sand particles to bring the water content of the mixture into the range 40 to 60% by weight.

Preferably, the shredded treebark, quarry stone particles and sand particles are mixed in the following proportions by volume:
 Shredded Treebark 50–75%
 Quarry stone particles 10–40%
 Silica sand particles 5–25%

Lignite may also be added in the proportion 0–15% by volume.

Minor minerals may be included in the mixture as required.

Preferably further, the quarry stone particles comprise particles of a relatively coarse aggregate with a range of particle sizes up to about 9.50 mm and a relatively fine aggregate with a range of particle sizes up to about 6.70 mm. More particularly, it is preferred that the coarse aggregate particles comprise between 10 to 15% by volume of the mixture and that the fine aggregate particles also comprise between 10 to 15% by volume of the mixture.

Preferably further, the silica sand particles comprise particles of relatively coarse and fine and aggregates. A major proportion of the coarse sand aggregate particles may fall in the size range 75 micron to 1.18 mm and a major proportion of the fine sand particles may fall in the size range 300 micron to 2.36 micron.

Preferably, the coarse sand particles comprise between 5 to 10% by volume of the mixture and the fine sand particles comprise between 10 to 15% by volume of the mixture.

The shredded treebark may be obtained from the bark of Pinus radiata or from the bark of slash Pine (Pinus elliottii) or from alternative barks as disclosed in Table A herein.

Preferably, composting of the shredded treebark is performed by laying out the mixture of shredded treebark particles, stone aggregate particles and sand particles in windrows, and aerating the shredded treebark by mechanically turning the material in the windrows so that composting proceeds within the temperature range 42–60 degrees Celcius.

The invention extends to any soil substitute produced by the above-described method and more generally extends to a soil substitute comprised of an intimate mixture of shredded and composted treebark, stone aggregate particles and silica sand particles.

Preferably, the composted treebark is such that a major proportion of its particles are such as to pass through a 15 mm sieve.

BEST MODES OF CARRYING OUT THE INVENTION

In order that the invention may be more fully explained the presently preferred materials and production process will now be described in some detail.

The main constituents used in the production process are:
 Shredded Treebark
 Course aggregate stone particles
 Fine aggregate stone particles
 Course silica sand particles
 Fine silica sand particles
 Minor Lignite minerals and chemicals as required
 Water The basic specifications of these materials are as follows:

Shredded Treebark

Treebark is obtained from the bark of pinus radiata, or from the bark of the Pinus elliotti (Slash Pine). Alternate materials that can be used are shown as Table A.

The bark is trucked into the plant in random sizes, and is basically size separated through a trommel screen.

It is then further separated into smaller sizes by partially drying and is then mixed with sand, aggregates, dusts, chemicals and water in a single pass through a mechanical blending plant.

The chemical additives are:
 Nitrogen
 Lime 0–2%
 Iron 0–0.5%
 Trace elements 0–2%
 Phosphoros 0–2%
 Gypsum 0–5%

The trace elements which may be used are manganese, boron, copper, zinc and molybdenum.

The chemical addition is by weight, and the amounts vary according to the client/end use need.

TABLE A

The treebark may be obtained from one or more of the following timber species:

| SOFTWOOD | |
|---|---|
| *Pinus radiata* | Monterey Pine |
| *Pinus elliottii* | Slash Pine |

TABLE A-continued

The treebark may be obtained from one or more of the following timber species:

| | |
|---|---|
| *Pinus pinaster* | Maritime Pine |
| *Pinus sylvestris* | Scotch Pine |
| *Pinus strobus* | White Pine |
| *Pinus echinrta* | Short leaf Pine |
| *Pinusa taeda* | Loblolly Pine |
| *Pinus plaustris* | Long leaf Pine |
| *Pinus ponderosa* | Ponderosa Pine |
| *Pinus monticola* | Western White Pine |
| *Pinus contorta* | Lodgepole Pine |
| *Pinus lambertiana* | Sugar Pine |
| *Sequoia sempervirens* | Redwood |
| *Libocedrus decurrens* | California Intense Cedar |
| *Taidium distichum* | Cypress |
| *Larix occidentalis* | Western Larch |
| *Tsuga canadensis* | Eastern Hemlock |
| *Abies magnifica* | Red Fir |
| *Abies concolor* | White Fir |
| *Pseudotsuga menziessil* | Douglas Fir |
| *Picea englemanii* | Engelman Spreuce |
| *Araucaria cunninghamii* | Hoop Pine |
| HARDWOOD | |
| *Quercus velutina* | Black Oak |
| *Quercus alba* | White Oak |
| *Quercus falcata* | Red Oak |
| *Quercus stellata* | Post Oak |
| *Carya spp.* | Hickory |
| *Liquidamber styraciflua* | Yellow Poplar |
| *Castanea dentata* | Chestnut |
| *Juglans nigra* | Black Walnut |

Coarse Aggregate

Two types of stone aggregates are used in the blend and these are generally in accordance with the specifications laid down by the Road Construction Authority of Victoria, and generally supported by the general specifications laid down in Australian Standard 2758.1 (Aggregates and Rock for Engineering Purposed-Part 1-Concrete Aggregates.)

In general, the course aggregates comply with R.C.A. Specification 812, and more particularly Table 812.021.

More specifically, the material added will comply with AS 2758.1, Table 1, Single Size Aggregate.

The mass of sample passing by % will be within the range:

| Sieve Size | Range % Pass |
|---|---|
| 6.70 mm | 100% |
| 4.75 mm | 85–100% |
| 2.36 mm | 0–40% |
| 0.075 mm | 0–2% |

The desired range for "stone dust" is therefore 0.75 mm to 5.0 mm.

Sand

These basically apply to sands that are added to the blend, two types are added— a "coarse" sand and a "fine" sand.

Fine aggregate grading requirements are shown in Australian Standard 2758.1 (Concrete Aggregates), and more specifically defined in R.C.A. Specification 610, Part 16, "Fine Aggregates".

The grading parameters are as follows:

| Sieve Size | Range % Pass by Mass |
|---|---|
| 4.75 mm | 90–100% |
| 2.36 mm | 75–100% |
| 1.18 mm | 50–90% |
| 0.6 mm | 30–60% |
| 0.3 mm | 10–30% |
| 0.15 mm | 2–10% |
| 0.075 mm | 0.3% |

The correct formulated blend may be obtained by using two types of sand, with the following specific individual grading limits:

| Fine Sand Sieve Size | Range % Pass By Mass |
|---|---|
| 2.36 mm | 99–100% |
| 1.18 mm | 97–100% |
| 600 micron | 85–96% |
| 300 micron | 45–70% |
| 150 micron | 5–50% |
| 75 micron | 0–3% |

The desired range of fine sand is therefore 75 micron to 1.18 mm.

Coarse Sand

The specification for coarse sands is derived from R.C.A. Specification 702 (Subsurface Drainage), and the relevant table is 702.051 "Grading Requirements for Granular Filter Material".

The grading requirements are:

| Sieve Size | Range % Pass by Mass |
|---|---|
| 2.36 mm | 100% |
| 1.18 mm | 95–100% |
| 600 micron | 70–98% |
| 300 micron | 30–60% |
| 150 micron | 0–12% |
| 75 micron | 0% |

This grading is defined as A1 single and first stage filter material.

The desired range is between 300 micron and 2.36 micron.

The coarser range is required to allow high hydraulic conductivity of water, and to prevent binding of the other components. In addition the use of coarse sand allows root growth to go downwards, rather than becoming root bound because of an impervious and inpenetrable barrier.

Water Quality

Water is a critical material in the composting process and should be within the following range:

| | |
|---|---|
| Acid/alkali range [pH] | 5.5 to 7.5 |
| Total dissolved salts not to exceed | 1000 parts per million |

Lignite

Lignite may be added in the range 0–15% by weight. The source of lignite is from the fine gradings of brown coal less than 5 mm diameter.

Production Process

The consistent materials are firstly prepared and mixed as follows:
(a) Treebark is graded and prepared
(b) Coarse aggregate is added
(c) Fine aggregate is added
(d) Coarse sand is added
(e) Fine sand is added
(f) Lignite
(g) Minor minerals are added. Minor minerals are generally known as "clay minerals" and include materials such as zealyte, Kaolite, Bentonite etc.

The ingredient materials are blended in the following ratios by volume:

| | |
|---|---|
| Shredded Treebark | 50-75% |
| Coarse aggregates | 10-20% |
| Fine aggregates | 10-20% |
| Coarse sand | 5-10% |
| Fine sand | 10-15% |
| Lignite | 0-15% |
| Minor trace elements as required. | |

The composting process consists of:

After single pass the material is laid out in windrows of any length, preferably about two meters high, and five meters wide.

Aeration of the windrows is carried out by mechanical means so that the product temperature is constantly within the range of 42-60 degrees Celcius.

If necessary water is added to replace losses caused by evaporation and microbial activity.

The final size of the composted treebark is within the range as follows:

| | |
|---|---|
| Passing 15 mm sieve | 100% |
| Retained on 8 mm sieve | 25-35% |
| Passing 3 mm sieve | 30-40% |

These size parameters are chosen as research and testing indicates that this size range allows the greatest root growth to take place under the widest range or climatic conditions.

In addition, this size range allows the overall correct particle size to be achieved when mixed with other ingredients.

It has been found that the most desirable characteristics or specifications for the final material are as follows:
(a) Bulk density less than 1 (one).
(b) Water content—Between 40% and 60%, as measured in Appendix F of the draft Australian Standard for Potting Mixes.
(c) Salt level—not to exceed 1000 S/cm.
(d) pH—between 6.5 and 7.5 as measured in Appendix G of Draft Australian Standard.
(e) Ammonium ion content not to exceed 100 p.p.m. as measured in Appendix C of Draft Standards.
(f) Nitrogen content (ammonium plus nitrate ions) must not exceed 250 p.p.m. as measured in Appendix C of the Draft Regulations.
(g) Bio—assay—the root length of germinating radish. Seeds must reach a minimum of 80% of the root length of a control as measured in Appendix E of the Draft Australian Standard for Potting Mixes.

The above specifications can be achieved in material produced in large quantities in accordance with the production process described above. This material has excellent plant propagating properties and its physical properties are such that it can be used as a soil substitute in large scale landscaping. However, the particular materials and process parameters which have been described in some detail are advanced by way of example only and they could be varied or modified according to the availability of materials and particular requirements for soil substitutes in some applications. It is accordingly to be understood that the invention is in no way limited to these particular materials and process paramters and that many modifications and variations will fall within the scope of the appended claims.

We claim:

1. A method for making a soil substitute comprising intimately mixing by volume from 50 to 70% of shredded treebark particles, from 10 to 40% of quarry stone particles and from 5 to 25% of silica sand particles to form a mixture and thereafter composting the shredded treebark particles while in the mixture; the quarry stone particles comprising relatively coarse aggregate having a range of particle sizes up to about 9.5 mm and relatively fine aggregate having a range of particle sizes up to about 6.7 mm; and the silica sand particles comprising relatively coarse and fine sand aggregates, a major proportion of the coarse sand particles falling within a size range of from 300 microns to 2.36 mm and a major proportion of the fine sand particles falling within a size range of from 75 microns to 1.18 mm.

2. The method of claim 1, wherein the composting of the shredded treebark is performed by laying out the mixture in windrows, adding water to said mixture to bring the water content of the mixture into the range 40 to 60% by weight, and aerating the shredded treebark by mechanically turning the mixture in the windrows so that composting proceeds within a temperature range of from 42°-60° C.

3. The method of claim 1, wherein from 0-15% by volume of lignite is added to the mixture prior to the composting step.

4. The method of claim 1, wherein the coarse particles comprise from 10 to 15% by volume of the mixture and the fine particles comprise from 10 to 15% by volume of the mixture.

5. The method of claim 1, wherein the coarse sand particles comprise from 5 to 10% by volume of the mixture and the fine sand particles comprise from 10 to 15% by volume of the mixture.

6. A soil substitute comprising an intimate mixture of from 50 to 70% of shredded and composted treebark particles, from 10 to 40% of quarry stone particles and from 5 to 25% of silica sand particles, a major proportion of the composted treebark particles being such as to pass through a 15 mm sieve, the quarry stone particles comprising relatively coarse aggregate having a range of particle sizes up to about 9.5 mm and relatively fine aggregate having a range of particle sizes up to about 6.7 mm, and the silica sand particles comprising relatively coarse and fine sand aggregates such that a major proportion of the coarse sand particles fall within a size range of from 300 microns to 2.36 mm and a major proportion of the fine sand particles fall within a size range of from 75 microns to 1.18 mm.

* * * * *